(12) United States Patent
Quellec et al.

(10) Patent No.: US 6,452,537 B2
(45) Date of Patent: Sep. 17, 2002

(54) METHOD OF EXPLORATION IN AZIMUTH FOR A RADAR, AND RADAR IMPLEMENTING THE METHOD

(75) Inventors: Jean-Michel Quellec, Ploumoguer; Gabriel Marchalot, Brest, both of (FR)

(73) Assignee: Thomson-Csf, Paris (FR)

( * ) Notice: Subject to any disclaimer, the term of this patent is extended or adjusted under 35 U.S.C. 154(b) by 0 days.

(21) Appl. No.: 09/729,825

(22) Filed: Dec. 6, 2000

(30) Foreign Application Priority Data

Dec. 10, 1999 (FR) ............................................ 99 15624

(51) Int. Cl.$^7$ ........................... G01S 13/00; G01S 13/66
(52) U.S. Cl. ........................... 342/158; 342/74; 342/195
(58) Field of Search ........................ 342/74–82, 89–103, 342/149–158, 368–377, 385, 386, 398, 175, 195

(56) References Cited

U.S. PATENT DOCUMENTS

| 3,648,284 A | | 3/1972 | Dax et al. | |
|---|---|---|---|---|
| 3,943,523 A | * | 3/1976 | Fassett | 342/368 |
| 5,357,259 A | * | 10/1994 | Nosal | 342/398 |
| 5,488,381 A | * | 1/1996 | Bardy | 342/372 |
| 5,841,391 A | | 11/1998 | Lucas, Jr. et al. | |

FOREIGN PATENT DOCUMENTS

| FR | 2549300 A1 | * | 1/1985 | ............ H01Q/3/00 |
|---|---|---|---|---|
| GB | 2150763 A | * | 7/1985 | ............ H01Q/3/00 |

OTHER PUBLICATIONS

Lewis Bruckler, "Dual–Use Air Traffic Control Radar", IEEE National Radar Conference, US, New York, NY: IEEE, May 11, 1998, pp. 26–31.

J. Croney, et al., "Radar polarization comparisons in sea-–clutter suppression by decorrelation and constant false alarm rate receivers", Radio and Electronic Engineer Oct. 1969, UK, vol. 38, No. 4 pp. 187–198.

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A system and method for scanning through a 360° azimuth by a surveillance radar antenna. The method includes driving at slow speed the radar antenna including two electronic scanning antennas installed back to back, simultaneously controlling the electronic aiming of each of the two electronic scanning antenna, switching the microwave signal sent alternatively between the two electronic scanning antennas and, before each rotation of the radar beam, initializing the electronic aiming of each of the two elementary electronic scanning antenna at a determined angle $\theta_i$. The radar system includes the radar antenna with the two elementary electronic scanning antennas and an aiming computer.

11 Claims, 4 Drawing Sheets

METHOD OF EXPLORATION IN AZIMUTH FOR A RADAR, AND RADAR IMPLEMENTING THE METHOD

BACKGROUND OF THE INVENTION

FIELD OF INVENTION

The invention pertains methods of fast exploration, by a surveillance radar antenna, on 360° in azimuth. The invention relates furthermore to surveillance radars implementing a method of fast exploration on 360° in azimuth.

The invention can be applied especially to sea patrol radars or helicopter detection radars.

DISCUSSION OF THE BACKGROUND

Certain missions for 360° surveillance require fast exploration in azimuth in order to obtain several measurements on the target during the detection time. This requirement can be explained especially for the following reasons:

- firstly, the target may have motions of rotation on itself. In particular, if the target consists of the blades of a helicopter, a submarine periscope or a ship's mast. During rotation, the target presents a variable surface to a radar. This surface is commonly designated by the acronym SER (or service equivalent radar). Now to obtain radar coverage on 360°, the approach used consists in rotating the beam of the radar antenna. Given the type of target, the faster the rotation of the radar antenna beam, the greater is the probability that the beam of the radar antenna will be directed towards the target when it has a big SER;
- secondly, the target may be buried in clutter with a correlation time smaller than that of the target, for example when the clutter is caused by the sea. The target can be separated from the clutter by carrying out several measurements during the detection time.

The approach used to carry out fast exploration with a radar antenna on 360° in azimuth consists in making the radar antenna beam rotate at high speed. To make the radar antenna beam rotate at high speed, the prior art techniques have undergone development from techniques based on automatic control systems to electronic scanning techniques.

Automatic control techniques achieve the mechanical rotation of the radar antenna by means of automatic control systems. Developments in the field of automatic control systems are used to obtain high rotation speeds. Sea surveillance radar, which is the subject of an article by J. Croney and A. Woroncow, "Radar Polarization Comparisons In Sea-Clutter Suppression By Decorrelation And Constant False Alarm Rate Receivers" in "The Radio and Electronic Engineer", Vol. 38, No. 4, October 1969, provides a rotational speed performance of this kind. The radar in question has two back-to-back mounted antennas with the same angular aperture. The antennas have cross polarizations that are vertical in one case and horizontal in the other. The radar power is switched over at each half-revolution, from one antenna to the other, in such a way that the p.p.i. image is divided into two 180° parts. The image of the first part is repeated on the second part with an orthogonal polarization in order to choose the polarization, and therefore the antenna, that is most suitable as a function of the sea clutter. The antennas are protected by an aerodynamically-shaped radome. The rotation speed of the antenna may reach 600 rpm.

Speed performance characteristics of this kind call for powerful and complex automatic control systems. The drawbacks of these systems are that they reduce reliability, are bulky and heavy and generally costly.

The development of radar techniques is leading to techniques that implement electronic scanning. The electronic scanning is used for example in certain advanced technology radars for combat aircraft. However, at present, electronic scanning antennas cannot cover 360°.

One of the goals of the invention is to provide for fast exploration on 360° in azimuth with an antenna radar that does not have the drawbacks of the above-described techniques based on automatic control systems.

SUMMARY OF THE INVENTION

To this end, an object of the invention is a method of fast exploration on 360° in azimuth by a radar antenna comprising two elementary electronic scanning antennas, installed back to back, capable of being electronically shifted by a maximum angle $\pm a_d$, the method consisting in:

- driving the antenna rotationally at a speed $w_1$,
- simultaneously controlling the electronic aiming of each elementary electronic scanning antenna so that the scanning of the radar beam of the antenna is done at a speed $w_2$ on one rotation, with $w_2$ verifying the following relationship:

$$w_2 = w_1 \times \frac{2\pi}{2\left(\frac{\pi}{2} - \alpha_d\right)}$$

- switching over the microwave signal sent, alternatively between the two elementary electronic scanning antennas, at a determined rate,
- before each rotation i of the radar beam, initializing the electronic aiming of each elementary electronic scanning antenna at a determined angle $\theta_i$.

The selection-switching rate is a function of the frequency of recurrence of the radar transmissions, the mechanical rotation speed, the aperture of the pencil beam of each antenna and the maximum aim shifting angle $\alpha_d$. To obtain an even illumination in azimuth for each elementary antenna, the selection-switching period is smaller than the time of illumination of a target.

A first preferred embodiment is characterized by a selection-switching rate identical to the frequency of the radar transmissions.

A second embodiment is characterized by a selection-switching rate that is variable as a function of the aiming direction.

A third embodiment is characterized by the association of the selection-switching control with polarization control. To each radar transmission, there corresponds a specified polarization.

The method can advantageously be used to make the radar beam rotate at a speed greater than the speed of mechanical rotation of the antenna.

Depending on its embodiments, the method is advantageously used to match the selection-switching rate to the direction of aim and choose the type of polarization at each radar transmission.

In one particular embodiment, the method can be used to obtain a rotation speed of the radar beam that is variable while having a constant mechanical rotation speed.

An object of the invention furthermore is a radar implementing the method. The radar comprises an antenna, an automatic control system, an aim computer and a selection-switching means.

The automatic control system drives the antenna in slow rotation at a speed $w_1$.

The antenna has two back-to-back mounted elementary electronic scanning antennas that can be shifted by a maximum angle $\pm\alpha_d$.

The aim computer simultaneously controls the electronic aiming of each elementary electronic scanning antenna so that the scanning of the radar beam of the antenna is done at a speed $w_2$ on a rotation, $w_2$ verifying the relationship:

$$w_2 = w_1 \times \frac{2\pi}{2(\frac{\pi}{2} - \alpha_d)}$$

and so that, before each rotation i of the antenna radar beam, the electronic scanning of each elementary electronic scanning antenna is initialized at a determined angle $\theta_i$.

The selection-switching means switch the microwave signal over alternatively between the two elementary electronic scanning antennas. The selection-switching means typically comprise a microwave selection switch driven by a selection switch control. The selection switch control is a function of the frequency of recurrence of the radar transmissions, the mechanical rotation speed and the aperture of the pencil beam of each antenna. A relay switches over the microwave transmission signal to one of elementary electronic scanning antennas.

In a first particular embodiment, the antenna has two reflector arrays.

In a second particular embodiment, the antenna has two active antennas.

The radar has the advantage of not requiring any complex and costly automatic control system.

BRIEF DESCRIPTION OF THE DRAWINGS

Other features and advantages shall appear from the following description. The description is made with reference to the appended figures, of which.

MORE DETAILED DESCRIPTION

Figure 1:
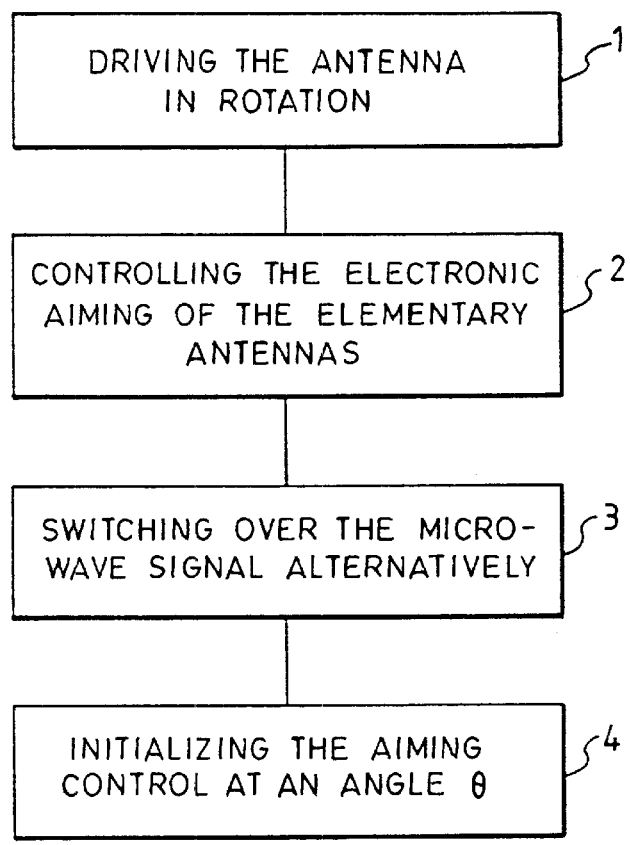
FIG. 1 shows a method according to the invention in the form of a flow chart.

The method according to the invention is shown in FIG. 1 in the form of a flow chart.

The method provides for fast exploration on 360° in azimuth by a radar antenna. The radar antenna has two elementary electronic scanning antennas mounted back to back. Each elementary electronic scanning antenna may be electronically offset by a maximum relative angle $\pm\alpha_d$.

The method consists in driving 1 the antenna in slow rotation at a speed $w_1$. The speed $w_1$ is typically constant. In a particular implementation of the method, the speed $w_1$ is equal to 30 rpm.

While controlling the mechanical rotation, the method controls 2 the electronic aiming of each elementary electronic scanning antenna so that the radar beam has an angular speed $w_2$ related to the speed $w_1$ by the following relationship:

$$\frac{w_2}{w_1} = \frac{2\pi}{2(\frac{\pi}{2} - \alpha_d)} \quad (1)$$

The electronic aiming control of each elementary electronic scanning antenna aims the beam of an elementary electronic scanning antenna at a relative angle that changes between the maximum angles of offset. In other words, the relative angle changes between the angle $-\alpha_d$ and the angle $+\alpha_d$ for the first elementary electronic scanning antenna and between the angle $\pi-\alpha_d$ and the angle $\pi+\alpha_d$ for the second elementary electronic scanning antenna, the angular reference corresponding to the normal to the first elementary electronic scanning antenna.

While controlling the electronic scanning of each elementary electronic scanning antenna, the method switches over 3 the microwave frequency alternatively between the two elementary electronic scanning antennas. The selection-switching rate is a function of the frequency of recurrence of the radar transmissions, the mechanical rotation speed and the aperture of the pencil-beam of each antenna. To obtain even illumination in azimuth for each elementary antenna, the selection switching period is smaller than the illumination time for a target.

A first preferred embodiment is characterized by a selection-switching rate identical to the frequency of the radar transmission.

A second embodiment is characterized by a selection-switching rate that is a multiple of the frequency of recurrence of the radar transmission.

A variant to the method consists of the association, with each selection switching operation, of a choice of antenna polarization. To each radar transmission, there corresponds a specified vertical or horizontal polarization.

The relationship (1) expresses the fact that, when the antenna performs a rotation of $$2(\frac{\pi}{2} - \alpha_d),$$

the radar beam scans $2\pi$ or 360° in azimuth.

After the beam has scanned 360° in azimuth, the method initializes 4 the electronic aiming of each elementary electronic scanning antenna at a determined absolute angle $\theta$ before starting a new exploration.

Figure 2:
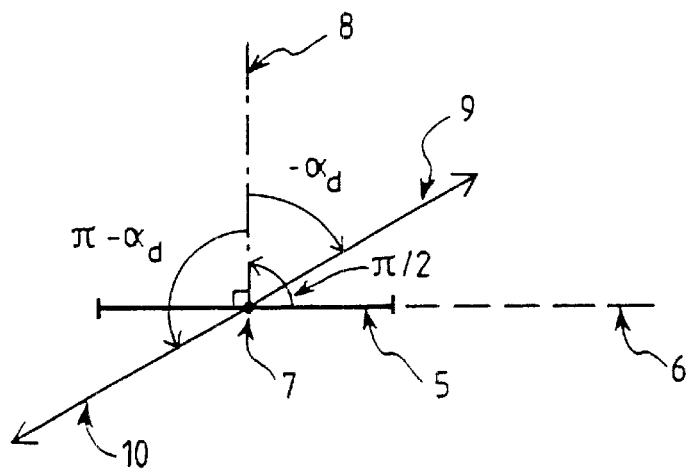
FIG. 2 shows the electronic aiming at an instant $t_o$.

FIG. 2 illustrates the electronic aiming at an instant $t_o=0$ taken as the starting point of the times. The antenna 5 is seen from the top. It is aligned with a mechanical reference axis 6 taken as the absolute angular reference axis. The antenna 5 can rotate about a rotation axis 7. The relative angular reference 8 is the normal to one of the elementary electronic scanning antennas of the antenna 5, the first elementary electronic scanning antenna for example. To each elementary electronic scanning antenna, there corresponds a beam. At the instant $t_o=0$, the first elementary electronic scanning antenna has a beam 9 initially offset by the relative angle $-\alpha_d$, the second elementary electronic scanning antenna has a beam 10 initially offset by the relative angle $\pi-\alpha_d$.

Figure 3:
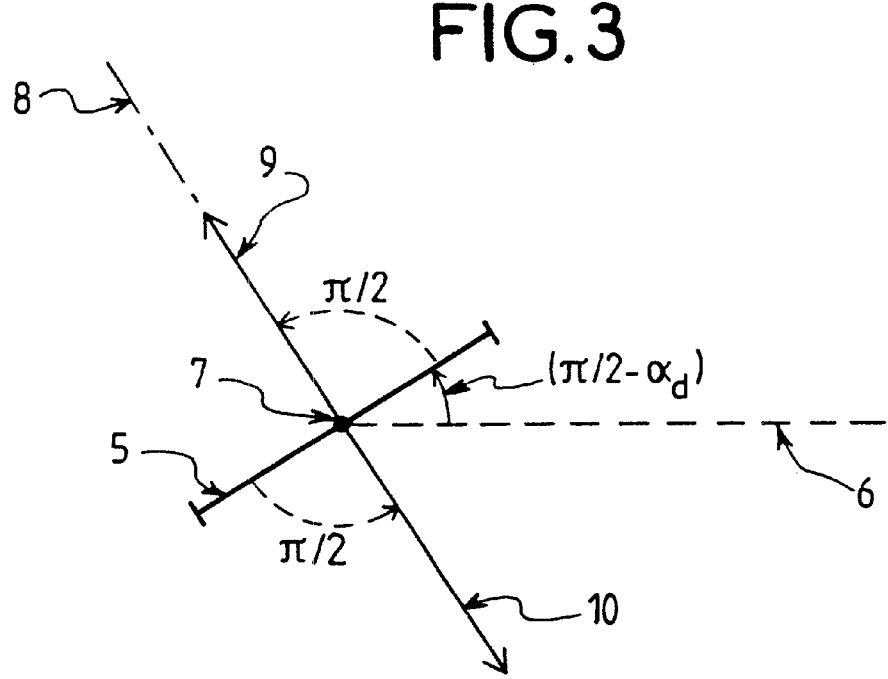
FIG. 3 shows the electronic aiming at an instant $t=t_o+Tf/2$.

FIG. 3 illustrates the electronic aiming at an instant $t=t_o+Tf/2$. Tf is the time needed for the beam of the antenna to scan $\pi$, namely 180° in azimuth. Between $t_o$ and $t_o+Tf/2$, the beam 9, 10 of each elementary electronic scanning antenna performs a scan corresponding to half of the scanning done by the beam of the antenna 5, namely $\pi/2$. Simultaneously with the electronic aiming, the antenna 5 rotates by an angle equal to $\pi/2-\alpha_d$. The ratio between the scanning angle of the beam and the rotation angle of the antenna is equal to:

$$\frac{\pi}{\left(\frac{\pi}{2} - \alpha_d\right)},$$

corresponding to the ratio between the speeds $w_2$ and $w_1$ given by the relationship (1).

Figure 4:
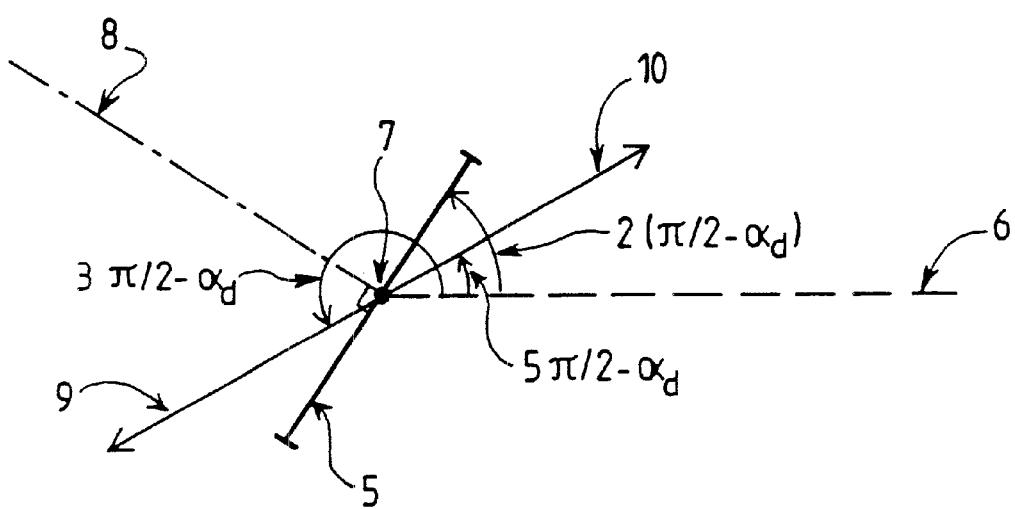
FIG. 4 shows the electronic aiming at an instant $t=t_o+Tf$.

FIG. 4 illustrates the electronic aiming at an instant $t = t_o + Tf$.

Between the instants $t_o + Tf/2$ and $t_o + Tf$, the beam 9, 10 of each elementary electronic scanning antenna scans a zone equivalent to the one scanned between the instants $t_o$ and $t_o + Tf/2$, giving a zone with an angle $\pi/2$.

Between the instants $t_o$ and $t_o + Tf$, the beam 9 of the first elementary electronic scanning antenna scans a zone ranging between the absolute angles $\pi/2 - \alpha_d$ and $3\pi/2 - \alpha_d$ and the beam 10 of the second elementary electronic scanning antenna scans a zone ranging between the absolute angles $3\pi/2 - \alpha_d$ and $5\pi/2 - \alpha_d$. Simultaneously with the electronic aiming, the antenna 5 rotates about its rotational axis 7 by an angle equal to $2(\pi/2 - \alpha_d)$. During the period Tf, the radar beam of the antenna scans through $2\pi$. Indeed, the beam of each elementary electronic scanning antenna scans $\pi$. At the instant $t_o + Tf$, the radar antenna explores 360° in azimuth.

At the instant $t_o + Tf$, the radar antenna is offset by an absolute angle $2(\pi/2 - \alpha_d)$.

Before the next scan rotation is done, the method consists in initializing the electronic aiming of each elementary electronic scanning antenna by a determined absolute angle $\theta$. The value of the angle $\theta$ is determined from the number of rotations already performed, the relationship (1) and the fact that, before making a rotation, the beam of each elementary electronic scanning antenna is offset by the maximum offset value.

Figure 5:
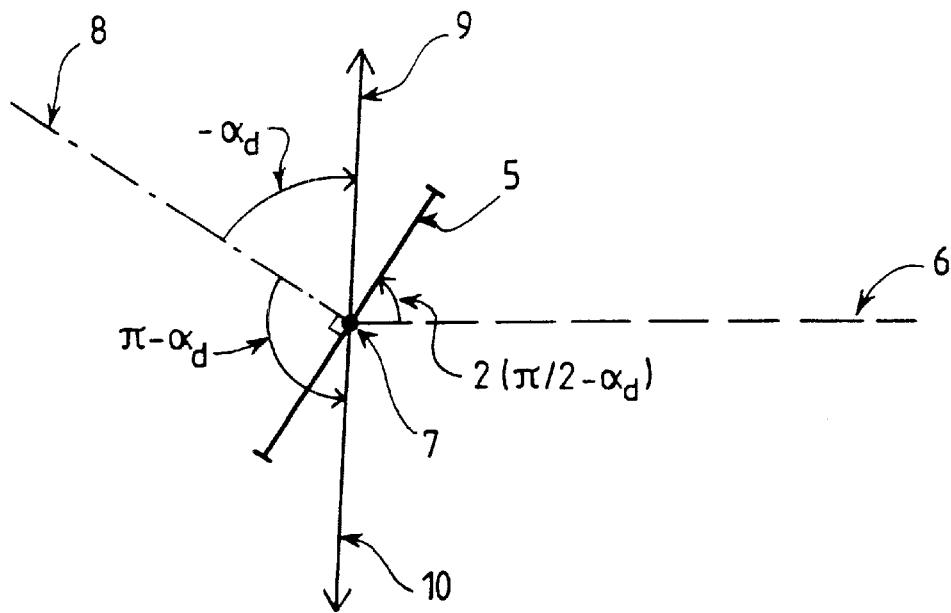
FIG. 5 shows the electronic aiming after initialization.

FIG. 5 illustrates the electronic aiming of each elementary electronic scanning antenna after the initialization performed at the end of the first rotation.

The beam 9 of the first elementary electronic scanning antenna is offset by a relative angle equal to $-\alpha_d$. The beam 10 of the second elementary electronic scanning antenna is offset by a relative angle equal to $\pi - \alpha_d$.

After the initialization phase, the fast exploration on 360° in azimuth is done similarly to the exploration described with reference to FIGS. 3 and 4.

The antenna 5 rotates about its rotational axis 7 at a speed $w_1$. Simultaneously with the rotation of the antenna 5, the electronic aiming control aims the beam of each elementary electronic scanning antenna at an angle that is a function of time. The relative aiming of each beam develops between the maximum offset angles of an elementary electronic scanning antenna.

Between the instants $t_o$ and $t_o + Tf$, with $t_o = Tf$, the beam 9 of the first elementary electronic scanning antenna aims between the relative angles $-\alpha_d$ and $+\alpha_d$, namely between the absolute angles $3(\pi/2-\alpha_d)$ and $5\pi/2-3\alpha_d$ because the antenna 5 rotates by an angle $\pi/2-\alpha_d$ between the instants $t_o$ and $t_o + Tf$.

Between the instants $t_o$ and $t_o + Tf$ with $t_o = Tf$, the beam 10 of the second elementary electronic scanning antenna aims between the relative angles $\pi-\alpha_d$ and $\pi+\alpha_d$, namely between the absolute angles $5\pi/2-3\alpha^d$ and $7\pi/2-3\alpha_d$ because the antenna 5 rotates by an angle $\pi/2-\alpha_d$ between the instants $t_o$ and $t_o + Tf$. Each beam of an elementary electronic scanning antenna scans a zone with an angle $\pi$ between the instants $t_o$ and $t_o + Tf$. The radar beam of the antenna scans $2\pi$.

At the instant $t_o + Tf$, with $t_o = Tf$, the radar antenna is offset by an angle $2(\pi/2 - \alpha_d)$ with reference to its position at the instant $t_o$.

The absolute offset of the radar antenna at the instant $t_o + Tf$ with $t_o = Tf$ is equal to $4(\pi/2 - \alpha_d)$.

Before undertaking the next scan rotation, the method consists in initializing the electronic aiming of each elementary electronic scanning antenna at a determined angle $\theta$ as described here above.

Figure 6:
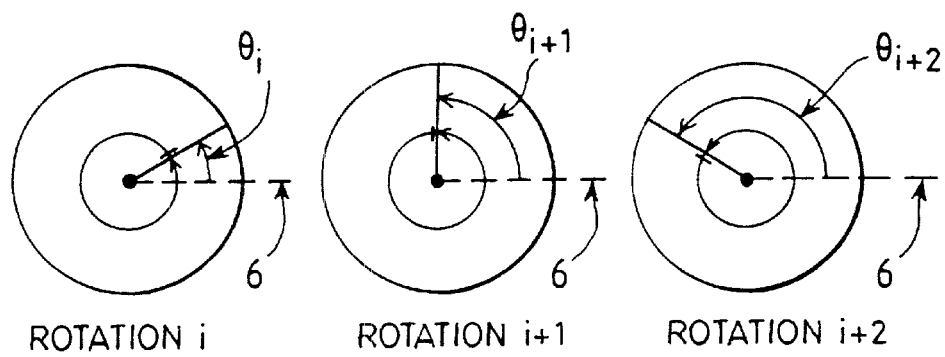
FIG. 6 shows the offset at the start of successive rotations.

FIG. 6 shows the starting offset of successive rotations. The rotation i is done with a starting point of rotation equal to $\theta_i$.

When i=1, the starting offset of the rotation i is equal to $\theta_1 = \pi/2 - \alpha_d$ along the mechanical reference axis 6 taken as the absolute angular reference axis.

The starting offset of the rotation i+1 is equal to $\theta_2 = 3(\pi/2 - \alpha_d)$.

The starting offset of the rotation i+2 is equal to $\theta_3 = 5(\pi/2 - \alpha_d)$.

The starting offset of the rotation j is equal to $(j-1) \times 2(\pi/2 - \alpha_d) + (\pi/2 - \alpha_d)$.

The starting offset of the successive rotations can easily be compensated for by means of a buffer memory to store all or part of the data corresponding to a rotation and readjust the radar images.

Figure 7:
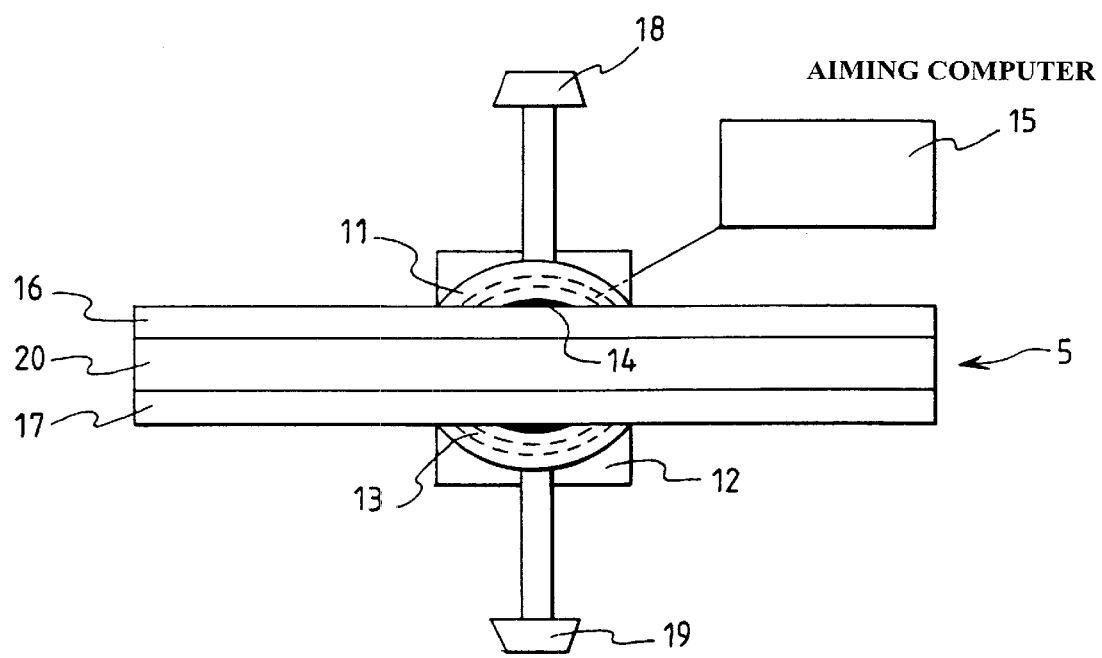
FIG. 7 shows an embodiment of a radar according to the invention.

A first embodiment of a radar for the implementation of the method according to the invention is shown schematically in FIG. 7.

The radar has a plate 11, an antenna 5, a system for the automatic control of the plate 12, a rotating joint 13, a selector switch 14 and an aiming computer 15.

The plate 11 can rotate 360° in azimuth. It is driven rotationally at a speed $w_1$ by means of the automatic control system 12.

The antenna 5 has a first elementary electronic scanning antenna 16 and a second elementary electronic scanning antenna 17.

The first embodiment of the radar is characterized by the particular structure of the first and second elementary electronic scanning antennas 16 and 17. Each elementary antenna corresponds to a reflector array with which an emission source 18, 19 is associated.

A second embodiment of the radar is characterized by an antenna formed by two active antennas.

The antenna 5 furthermore comprises a control circuit 20.

The two reflector arrays are installed back to back. Each reflector array may be offset electronically by a maximum angle $\alpha_d$ in the clockwise direction and the anticlockwise direction with respect to the normal of each reflector array. Each emission source 18, 19 is installed so as to face a reflector array 16, 17. The selector switch 14 switches the microwave signal over to the first emission source 18 or to the second emission source 19. The control circuit 20 is connected firstly to the first reflector array 16 and secondly to the second reflector array 17. It sequentially controls the diodes of the phase shift cells of the first reflector array 16 and the diodes of the phase shift cells of the second reflector array 17.

The plate 11 bears the antenna 5 which rotates with the plate 11.

The rotating joint 13 transmits different microwave signals (transmission and reception) between the plate 11 and the duplexer (not shown). It furthermore sets up the digital control link between the plate 11 and the aiming computer 15.

The aiming computer 15 controls the electronic aiming of each reflector array 16, 17. The aiming control is such that the scanning of the radar beam is done at a speed $w_2$ on a rotation, with $w_2$ verifying the relationship (1). Before each rotation i of the radar beam, the aiming computer 15 initializes the electronic aiming of each reflector array 16, 17 at a determined angle $\theta_i$ as described with reference to FIG. 6.

According to a particular embodiment of the first mode, each reflector array may have a horizontal or vertical polarization, the associated source having the same polarization.

When the two reflector arrays are crossed polarization arrays, the antenna provides for polarizing agility. The first reflector array has a horizontal polarization as does the associated emission source and the second reflector array has a vertical polarization as does the associated emission source.

One variant to the embodiments of the radar comprises a means associated with a selector switch. This means is used to determine the polarization of each elementary electronic scanning antenna. The association with the selector switch determines the polarization of the elementary electronic scanning antenna at each selection switching operation.

What is claimed is:

1. A method for scanning though a 360° azimuh by a radar antenna having two electronic scanning antennas installed back to back and configured to be electronically shifted by a maximum angle$\pm\alpha_d$, the method compromising:

rotating the radar antenna rotationally at a speed $w_1$ during a rotation i of the radar antenna about the 360° azimuth;

simultaneously controlling the electronic aiming of each of said two electronic scanning antennas so that a scanning of a radar beam of the radar antenna occurs at a speed of $w_2$ on one rotation of the radar antenna, with $w_2$ satisfying the following relationship:

$$w_2 = w_1 \times \frac{2\pi}{2\left(\frac{\pi}{2} - \alpha_d\right)};$$

swithching a microwave signal sent alternatively between the two elementary electronic scanning antennas at a determined rate; and before each rotation i of the radar beam, initializing an electronic aiming of each of said two electronic scanning antennas at a determined angle $\Theta_i$.

2. A method of claim 1, wherein the initializing comprises:

determining the angle $\Theta_i$ by the relationship:

$$\theta_i = (i-1) \times 2\left(\frac{\pi}{2} - \alpha_d\right) + \left(\frac{\pi}{2} - \alpha_d\right).$$

3. A method of claim 1, wherein the switching a microwave signed comprises:

switching the microwave signal during a period smaller than a time of illumination of a goal.

4. A method according to claims 1, 2, or 3, wherein the switching a microwave signal comprises:

switching the microwave signal at a rate equal to a frequency of recurrence of radar transmissions.

5. A method of claim 3, wherein the switching of a microwave signal comprises:

switching the microwave signal at a rate that is a multiple of a frequency of recurrence of radar transmissions.

6. A method of claim 1, wherein the switching a microwave signal comprises:

switching the microwave signal at a rate that is a function of an aiming angle.

7. A radar system comprising:

a radar antenna including, two electronic scanning antennas installed back to back and configured to be electronically shift by a maximum angle$\pm a_d$;

an automatic control system configured to drive the radar antenna rotationally at a speed $w_1$;

an aiming computer configured to simultaneously control electronic aiming of each of the electronic scanning antennas so that a scanning of a radar beam of the radar antenna occurs at a speed of $w_2$ on one rotation, with $w_2$ satisfying the following relationship:

$$w_2 = w_1 \times \frac{2\pi}{2\left(\frac{\pi}{2} - \alpha_d\right)};$$

and, before each said rotation i of the radar beam, to initialize the electronic aiming of each of the two electronic scanning antennas at a determined angle $\theta_i$; and a selector switch configured to switch a microwave signal sent alternatively between each of the two electronic scanning antennas at a determined rate.

8. A radar according to claim 7, wherein the electronic scanning antennas are configured to have one polarization.

9. A radar according to claim 7, wherein the electronic scanning antennas are configured to have polarizations different from each other.

10. A radar according to claim 9, wherein the electronic scanning antennas comprise reflector arrays.

11. A radar according to claim 9, wherein the electronic scanning antennas comprise active antennas.

* * * * *